US 8,982,302 B2

(12) United States Patent
Kim et al.

(10) Patent No.: US 8,982,302 B2
(45) Date of Patent: Mar. 17, 2015

(54) PATTERNED RETARDER TYPE STEREOSCOPIC IMAGE DISPLAY DEVICE AND METHOD FOR MANUFACTURING THE SAME

(71) Applicant: LG Display Co., Ltd., Seoul (KR)

(72) Inventors: Jin-Yeong Kim, Gyeonggi-do (KR); Hee-Young Chae, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 159 days.

(21) Appl. No.: 13/674,405

(22) Filed: Nov. 12, 2012

(65) Prior Publication Data
US 2013/0342771 A1 Dec. 26, 2013

(30) Foreign Application Priority Data
Jun. 21, 2012 (KR) .................. 10-2012-0066808

(51) Int. Cl.
*G02F 1/1333* (2006.01)
*G02F 1/1343* (2006.01)
*G02F 1/1345* (2006.01)
*G02B 5/30* (2006.01)
(Continued)

(52) U.S. Cl.
CPC .............. *G02B 27/26* (2013.01); *G02B 5/3083* (2013.01); *G02F 1/136209* (2013.01); *G02F 2001/133631* (2013.01); *G02F 2001/136272* (2013.01)
USPC ............ 349/110; 349/139; 349/149; 349/152

(58) Field of Classification Search
CPC ................... G02F 1/133509; G02F 1/133512; G02F 2001/133388; G02F 1/136209

USPC .................................. 349/110, 139, 149, 152
See application file for complete search history.

(56) References Cited

U.S. PATENT DOCUMENTS

2002/0054253 A1* 5/2002 Cho et al. ...................... 349/110
2004/0032557 A1* 2/2004 Lee et al. ...................... 349/141
(Continued)

FOREIGN PATENT DOCUMENTS

JP 2010-055043 A 11/2010
KR 1020020031984 A 5/2002
(Continued)

OTHER PUBLICATIONS

Office Action dated Jul. 30, 2013 from the Korean Intellectual Property Office in counterpart Korean application No. 10-2012-0066808.
(Continued)

*Primary Examiner* — Nathanael R Briggs
(74) *Attorney, Agent, or Firm* — Morgan, Lewis & Bockius LLP

(57) ABSTRACT

A stereoscopic image display device includes a first substrate defining an active area and a non-active area surrounding the active area, the first substrate having a gate line formed at the active area and the non-active area, a gate pad formed at the non-active area, a dummy line defining a dummy pixel by crossing the gate line, and a light leakage blocking layer that is connected to the dummy line and disposed to overlap the gate line and the gate pad; a second substrate opposing the first substrate, the second substrate having a black stripe on a side of the second substrate opposite from the first substrate along portions corresponding to edges of the active area, and a patterned retardation film over the black stripe; and a liquid crystal layer disposed between the first and second substrates.

24 Claims, 4 Drawing Sheets

(51) Int. Cl.
*G02B 27/26* (2006.01)
*G02F 1/1362* (2006.01)
*G02F 1/13363* (2006.01)

(56) References Cited

U.S. PATENT DOCUMENTS

2004/0109102 A1    6/2004   Chang et al.
2005/0270446 A1*  12/2005   Kim et al. ..................... 349/110
2010/0033557 A1*   2/2010   Abe et al. ........................ 348/58
2011/0156995 A1*   6/2011   Choi et al. ..................... 345/92

FOREIGN PATENT DOCUMENTS

KR    1020040051073 A    6/2004
KR    10-2008-0052768 A  12/2008

OTHER PUBLICATIONS

Office Action dated Jan. 10, 2014 from the Korean Intellectual Property Office in counterpart Korean application No. 10-2012-0066808.

* cited by examiner

PATTERNED RETARDER TYPE STEREOSCOPIC IMAGE DISPLAY DEVICE AND METHOD FOR MANUFACTURING THE SAME

The present application claims the benefit of Korean Patent Application No. 10-2012-0066808 filed in Republic of Korea on Jun. 21, 2012, which is hereby incorporated by reference.

BACKGROUND

1. Field of the Invention

The present application relates to a patterned retarder type stereoscopic image display device, and more particularly, to a patterned retarder type stereoscopic image display device with increase vertical viewing angle and decreased the light leakage.

2. Discussion of the Related Art

Recently, due to developments of various video contents, stereoscopic image display devices which the user can select the display type (two- or three dimensional) has been introduced. The three-dimensional display can be accomplished using the stereoscopic technique or the autostereoscopic technique.

The stereoscopic technique uses a binocular disparity due to a separation distance between the eyes. This type can be divided into the glasses type and the glasses-free type. Among the glasses type, there is a stereoscopic image display device where a patterned retarder is disposed on a display panel. This type of device accomplishes three-dimensional display using polarization properties of the patterned retarder on the display panel and those on the glasses. They have advantages in having small cross-talk between two eyes and in having good display quality of high brightness compared to other types.

At this time, the display panel for displaying both two-dimensional and three-dimensional images can be one of the various flat panel display devices such as the liquid crystal display (LCD) device, the field emission display (FED) device, the plasma display panel (PDP), the Electrophoresis (EPD), or the electroluminescence device (EL) including the inorganic electroluminescence device and the organic light emitting display (OLED) device.

As one example, a display panel of an LCD device will be explained. FIG. 1 is a schematic view of a patterned retarder type stereoscopic image display device according to the related art.

As shown in FIG. 1, the display device 1 has a display panel 20 for displaying a two-dimensional image or three-dimensional image and a patterned retarder 17 attached to the display panel 20. The display panel includes an array substrate 10 and a color filter substrate 12 having a color filter 13 and a black matrix 14, a liquid crystal layer 15 between the array substrate 10 and the color filter substrate 12, and first and second polarizing plates 16a and 16b attached to the color filter substrate 12 and to the array substrate 10, respectively. The patterned retarder 17 is attached to the first polarizing plate 16a, and has a first retarder for selectively transmitting only first polarizing light and a second retarder for selectively transmitting only second polarizing light. The first and second retarders are formed line-by-line in turns. At this time, a protection film 18 may be formed on the patterned retarder 17.

The display device 1, as described, alternately displays a right-eye image and left-eye image on the display panel, and switches the polarizing properties from the polarizing glasses though the patterned retarder 17. The viewer combines the transmitted-left-eye and the right-eye images respectively and realizes a three-dimensional stereoscopic image.

When the three-dimensional stereoscopic image is accomplished, a three-dimensional (3D) cross-talk can occur according to the viewing positions. That is, when users see the display panel in up- and down direction, the left-eye image may pass not only the first retarder but also the second retarder and get mixed with the right-eye image. And similarly, the right-eye image may become mixed with the light-eye image.

By enlarging the width of the black matrix, the viewing angle can be broadened and the 3D cross-talk can be prevented from occurring. However, this method results in lowering the opening aperture ratio and brightness of the front side. Thus, the display becomes dark and proper chroma is difficult to obtain.

Meanwhile, a light leakage problem generally exists in the display panel. Light from the backlight unit leaks around the front or side of the display panel. To solve the problem, additional black matrix is formed on the non-active area of the display panel. To fulfill the purpose, it is necessary that the black matrix satisfy insulation characteristics, or that a dielectric constant should be below 3.0. However, pigment for the black matrix is generally carbon black, which does not have enough insulation characteristics. Thus, although it is possible to lower reflection of the light, passing of light cannot be blocked.

In order to solve the above problem, black column spacers are formed on the non-active area of the display panel instead of the black matrix. But, manufacturing cost becomes high and the adhesion of the array substrate and the color filter substrate is not so good.

SUMMARY

Accordingly, the present disclosure is directed to a stereoscopic image display device that substantially obviates one or more of the problems due to limitations and disadvantages of the related art.

An object of the present disclosure is to provide a stereoscopic image display device that can improve viewing angle and reduce the cross talk phenomenon.

Another object of the present disclosure is to provide a stereoscopic image display device that can solve the light leakage problem using even transparent column spacers.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a stereoscopic image display device includes a first substrate defining an active area and a non-active area surrounding the active area, the first substrate having a gate line formed at the active area and the non-active area, a gate pad formed at the non-active area, a dummy line defining a dummy pixel by crossing the gate line, and a light leakage blocking layer that is connected to the dummy line and disposed to overlap the gate line and the gate pad; a second substrate opposing the first substrate, the second substrate having a black stripe on a side of the second substrate opposite from the first substrate along portions corresponding to edges of the active area, and a patterned retardation film over the black stripe; and a liquid crystal layer disposed between the first and second substrates.

In another aspect, a stereoscopic image display device includes a first substrate defining an active area having a plurality of unit pixels and a non-active area surrounding the active area, the first substrate having a plurality of dummy common lines and a gate pad at the non-active area, a gate insulation layer formed on the dummy common lines and the gate pad, a dummy line on the gate insulation layer to correspond to the dummy common lines, and a light leakage blocking layer that is connected to the dummy line and disposed over one of the plurality of the dummy common lines and a portion of the gate pad; a second substrate opposing the first substrate, the second substrate having a black stripe on a side of the second substrate opposite from the first substrate at the non-active area along portions corresponding to edges of the active area, and a patterned retardation film over the black stripe; and a liquid crystal layer disposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
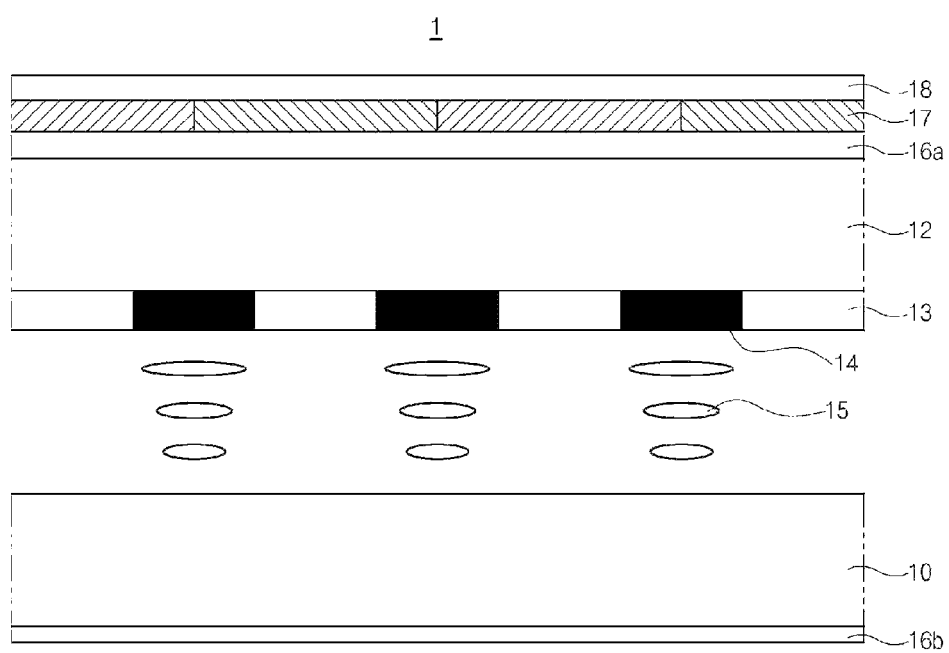
FIG. 1 is a schematic view of a patterned retarder type stereoscopic image display device according to the related art.
Figure 2:
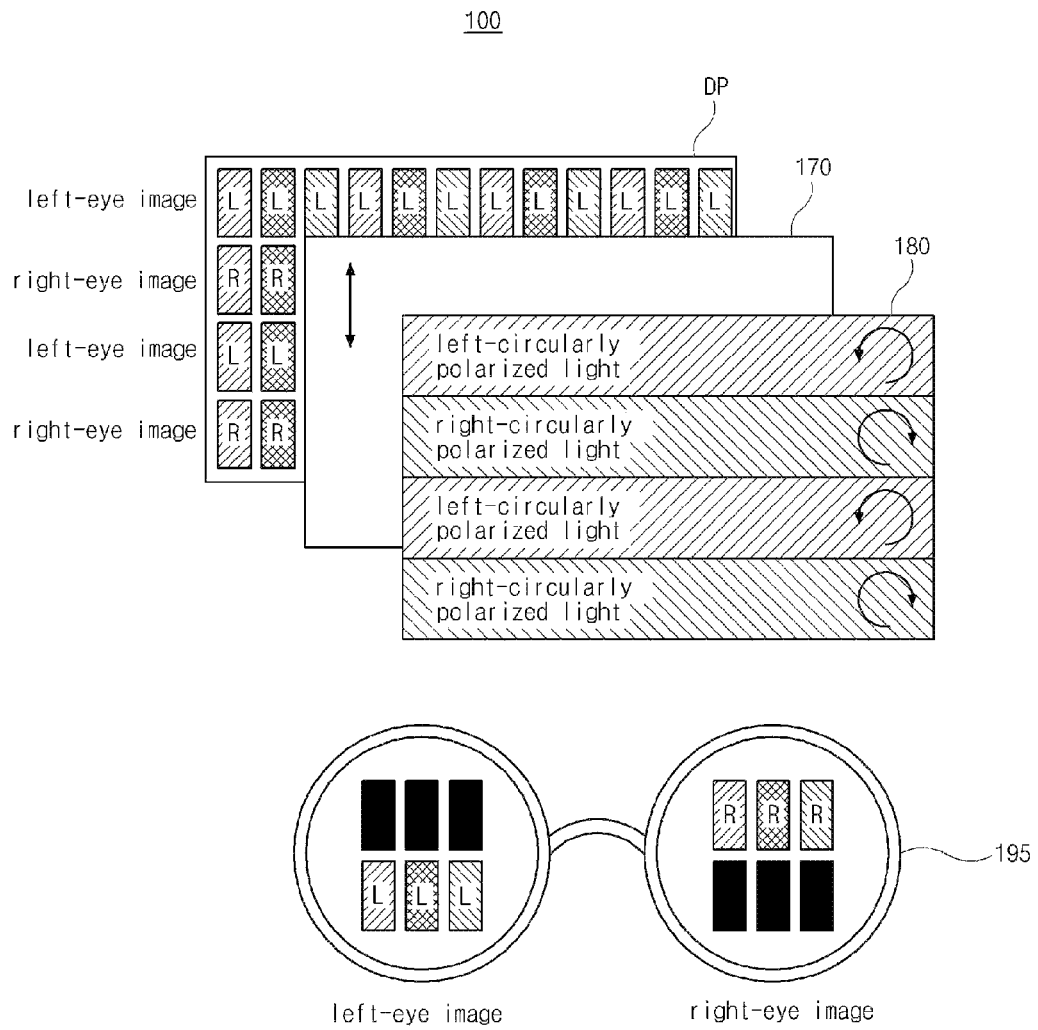
FIG. 2 is a drawing illustrating a patterned retarder stereoscopic image display device according to an example of a first embodiment.

FIG. 2 is a drawing showing of a patterned retarder stereoscopic image display device according to an example of a first embodiment. As shown in FIG. 2, the stereoscopic image display device includes a display panel (DP), a polarizing plate 170, a patterned retarder 180, and a pair of polarization glasses 195. If a liquid crystal display panel is used for the display panel (DP), the stereoscopic image display device further includes a backlight unit under the display panel (DP) and a polarizing plate (not shown) between the display panel (DP) and the backlight unit.

The patterned retarder 180 and the polarization glasses separate the right-eye image and the left-eye image and enable the left-eye and right-eye images of display from the display panel to have different phases from each other.

Though not shown in drawings, the display panel (DP) has two substrates and a liquid crystal layer between them. On the first substrate, a thin film transistor array and a color filter are formed. On the second substrate opposing the first substrate, a polarizing plate 170 is attached. Another polarizing plate (not shown) is also attached on the first substrate. The display panel (DP) displays a right-eye image and a left-eye image in turns in a form of line-by-line.

The polarizing plate 170 is an analyzer that is attached on the second substrate of the display panel (DP) and transmits specified linearly polarized light of the emitted light from the liquid crystal layer of the display panel (DP).

A patterned retarder 180 has first and second retarders disposed in turns in a form of line by line for each other. Each of the retarders preferably has an optical axis of +45° and −45° with respect to a transmission axis of the polarizing plate 170. Thus, the optical axis of the first retarder and the optical axis of the second retarder cross each other perpendicularly.

Each of the retarders may have a phase difference of $\lambda/4$ (quarter wave) using birefringence medium. That is, the first retarder is disposed on the display panel (DP) to oppose the line displaying left-eye images and converts the light of the left-eye image to a first polarization light (a circularly polarized light or a linearly polarized light). The second retarder is disposed on the display panel (DP) to oppose the line displaying right-eye images and converts the light of the right-eye image to a second polarization light (a circularly polarized light or a linearly polarized light).

As one example, the first retarder functions as a polarizing filter transmitting a left circularly polarized light and the second retarder functions as a polarizing filter transmitting a right circularly polarized light.

Attached to the left glass of the polarization glasses 195, a polarizing film transmits only a first polarizing light. Attached to the right glass of the polarization glasses 195, a polarizing film transmits only a second polarizing light. That is, the user wearing the pair of polarizing glasses 195 sees only left-eye images through the left eye and sees only right-eye images through the right eye. Therefore, the user recognizes the image on the display panel (DP) as a stereoscopic image.

Hereinafter, the first substrate of a stereoscopic image display device according to the first embodiment will be explained in detail. The same elements of the stereoscopic image display device explained above have the same reference numbers and the explanation is omitted.

Figure 3:
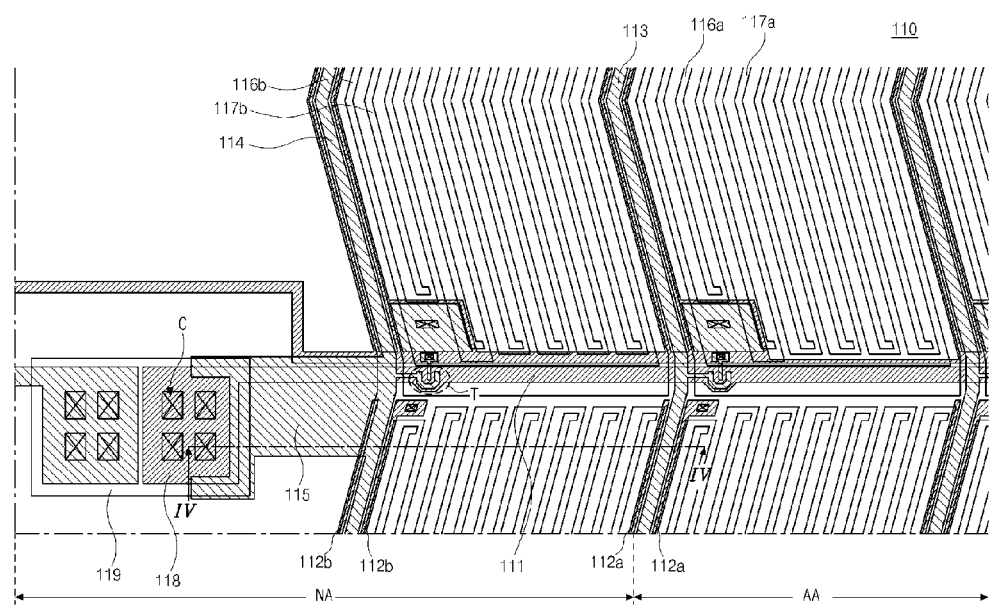
FIG. 3 is a plan view of a first substrate of a patterned retarder stereoscopic image display device according to the first embodiment.
Figure 4:
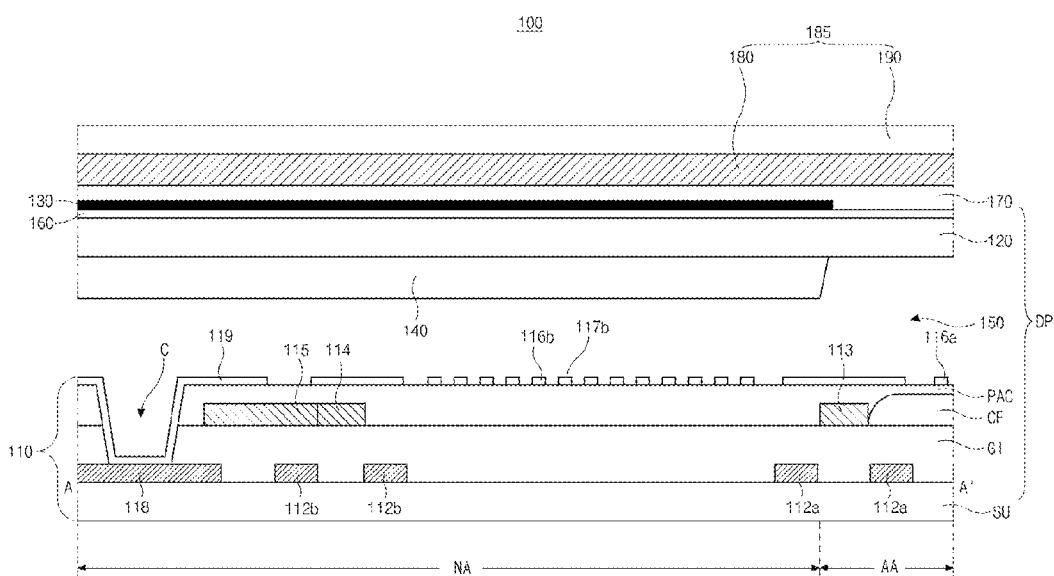
FIG. 4 is a cross-sectional view taken along line IV-IV of FIG. 3, showing of a patterned retarder stereoscopic image display device having the first substrate.

FIG. 3 is a plan view of the first substrate according to the embodiment of FIG. 2, and FIG. 4 is a cross-sectional view taken along a line IV-IV of FIG. 3. In FIG. 4, other elements for the whole stereoscopic image display device are added.

FIGS. 3 and 4 mainly show the first substrate having a dummy pixel and a pad portion on the non-active area.

As shown in FIG. 3, a common electrode 117a and a pixel electrode 116a are disposed on the first substrate 110, and the liquid crystal is driven by a horizontal electric field occurring by the common electrode 117a and the pixel electrode 116a. On the first substrate 110, a color filter is disposed without black matrix, thus the structure is so called COT (Color Filter on TFT) without black matrix. The first substrate has a gate line 111 formed on an active area and a non-active area outside of the active area; a gate pad 118 formed on the non-active area; a dummy line 114 defining a dummy pixel by crossing each other with the gate line 111; and a light leakage blocking layer 115 connected to the dummy line 114 and overlapping the gate line 11 and the gate pad 118 on the non-active area.

In FIG. 3, the light leakage blocking layer 115 is connected to the dummy line 114 and overlaps the gate line 111 and the gate pad 118 on the non-active area (NA).

Meanwhile, in FIG. 4, the stereoscopic image display device 100 includes a display panel (DP) displaying 2D or 3D images and a patterned retardation film 185 attached on the display panel.

The display panel (DP) includes a first substrate 110, a second substrate 120, and a liquid crystal layer 150 between the substrates. On the second substrate, a rear surface ITO 160, a black stripe 130, a polarizing plate 170 and a patterned retardation film 185 are sequentially formed.

For example, the first substrate 110 includes a substrate (SU) defining an active area having a plurality of pixels and a non-active area outside of the active area, plurality of dummy common lines 112b and a gate pad 118 formed on the non-active area of the substrate (SU), a gate insulation layer (GI) formed on the dummy common lines 112b and the gate pad 118, a dummy line 114 formed on the gate insulation layer (GI) corresponding to the dummy common lines 112b, and a light leakage blocking layer 115 connected to the dummy line 114 and formed on either a portion of the gate pad 118 or dummy common lines 112b.

Hereinafter, a method for manufacturing the stereoscopic image display device according to the embodiment will be explained with reference to the drawing.

Plurality of gate lines 111 (of FIG. 3) are formed on the substrate (SU) through photolithography and etching processes. At the same time, on the active area (AA) a gate line (not shown), plurality of common electrode lines 112a, and on the non-active area (NA) plurality of dummy common lines 112b and a gate pad 118 are formed.

Next, on the entire substrate having the gate lines 111 (of FIG. 3), the common lines 112a, the dummy common lines 112b, and the gate pad 118, a gate insulating layer (GI) is formed of an inorganic material such as silicon nitride ($SiN_x$) or silicon oxide ($SiO_2$) silicon oxide.

In succession, on the active area (AA) of the substrate (SU), a plurality of data lines 113 are formed. The data lines 113 define pixel areas by crossing each other with the gate line s 111 (of FIG. 3). At the same time, on the non-active area (NA), dummy lines 114 and a light leakage blocking layer 115 connected to the dummy lines are formed. The dummy lines 114 define dummy pixels by crossing each other with the gate lines 111 (of FIG. 3).

As shown in FIG. 4, the light leakage blocking layer 115 is formed on one of the dummy common lines 112b and on a portion of the gate pad 118. In order not to cause a short with the contact hole (C), the light leakage blocking layer 115 does not overlap entire of the gate pads 118.

On the entire substrate (SU) having the gate insulation layer (GI), a color filter (CF) is formed by coating color pigments, exposure to light and development. The color filter (CF) corresponds to the unit pixel. The color filter (CF) functions to convert light from the liquid crystal layer 150 to red, green, and blue.

Next, on the entire substrate (SU) having the color filter (CF), a protection layer (PAC) is formed of organic material such as benzocyclobuten (BCB) or acryl, or inorganic material such as silicon nitride ($SiN_x$).

In succession, on the contact hole (C) formed by eliminating a portion of the protection layer (PAC), a gate pad electrode 119 is formed to connect with the gate pad 118. At the same time, on the non-active area, plurality of dummy pixel electrodes 116b and plurality of dummy common electrodes 117b are formed.

Also, on the active area (AA) a pixel electrode 116a and a common electrode 117a are formed of non transparent metal on the protection layer (PAC). The pixel electrode 116a and the common electrode 117a can function as a black matrix, thus there is no need to form a black matrix. At this time, the non transparent metal layer may further include a low reflection oxide layer thereon, which reduces reflection rate of light from outside of the panel.

On the active area (AA) a thin film transistor (not shown) is formed for each unit pixel. The thin film transistor is turned on by a gate signal from the gate line 111 and transmits data signal from data line 113 to the pixel electrode 116a.

Therefore, by forming the dummy line 114 and the light leakage blocking layer 115 on the non-active area of the display panel (DP), the light leaking between the gate lines can be prevented. There is no need of additional processes for forming the dummy line 114 and the light leakage blocking layer 115, thereby avoiding a complex manufacturing process.

In the meantime, on the second substrate 120, a rear surface ITO 160 and a black stripe 130, a polarizing plate 170, and a patterned retardation film 185 are sequentially formed.

The polarizing plate 170 is formed on the black stripe 130 and polarizes light from the display panel (DP). A patterned retardation film 185 is disposed on the polarizing plate 170 and includes a protection film 190 and a patterned retarder 180 on the protection film 190.

The rear surface ITO 160 is formed on the entire second substrate 120 and discharges static electricity occurring on the second substrate 120. Alternatively, other arrangements may be used, such as, the rear surface ITO 160 may cover the black stripe 130 to function as a protection layer for protecting the black stripe 130.

For example, the black stripe 130 may be formed on the outer surface of the second substrate 120 and the rear surface ITO 160 can cover the black stripe 130. Also, an adhesive (not shown) can be formed on the polarizing plate 170, which is attached on the black stripe 130 and the rear surface ITO 160.

The black stripe 130 is formed between the display panel (DP) and the patterned retarder 180, especially corresponding to a boundary area of first and second retarders. The pixel electrode 116a functions as a black matrix, and the black stripe 130 is separated from the pixel electrode 116a by about thickness of the second substrate 120. The black stripe 130 overlaps the pixel electrode 116a, which can be called a double black stripe structure. That is, by additionally forming the black stripe 130, the 3D cross-talk of the right-eye image and the left-eye image can be avoided, and lowering of opening aperture ratio and the chroma can be prevented.

At this time, the black stripe 130 should be elongated to the non-active area (NA). That is, by disposing the black stripe 130 to elongate to the non-active area (NA), outside the boundaries of the active area (AA), the light leakage occurring at the outer periphery of the display panel (DP) can be prevented.

Also, the black stripe 130 is formed of non-transparent conductive material, such as molybdenum-tungsten alloy (MoTi) or copper nitride ($CuN_x$), which can prevent static electricity from occurring. Even if the rear ITO 160 is eliminated, the black stripe 130 can block the static electricity instead of the rear ITO. These metals have good adhesive properties and anti-abrasion properties.

In succession, the first substrate 110 and the second substrate 120 are attached in the form of opposing to each other. And the liquid crystal layer 150 between the two substrates and the column spacer 140 to maintain gap of the two substrates are formed. At this time, the column spacer 140 is formed of a transparent organic insulation material without any black pigment.

Also, to determine a pre-tilt angle of the liquid crystal, orientation layers (not shown) can be further formed between the liquid crystal layer 150 and each of first and second substrates 110 and 120.

Finally, to maintain the attached state of first and second substrates as one panel, a seal pattern (not shown) which functions as an adhesive is formed in the shape of surrounding the liquid crystal layer in the non-active area (NA).

According to the invention by elongating the black stripe 130 to the non-active area (NA), the vertical (up-and-down) viewing angle can be increased, and cross-talk can be reduced. Also, light leakage problem can be solved. That is, by additionally forming the dummy lines 114 and light leakage blocking layer 115, it is possible to improve display quality by preventing a bright line error, which was resultant from light leakage through a side surface of the device.

Further, since it is not necessary to precede additional process to form the non-active area (NA) of the display panel, all light leakage problem through the front surface or side surface of the display panel can be solved, without complicating the manufacturing process, even with adopting the transparent column spacer.

It will be apparent to those skilled in the art that various modifications and variations can be made in a method of fabricating a patterned retarder of the present disclosure without departing from the sprit or scope of the invention. Thus, it is intended that the present invention covers the modifications and variations of this invention provided they come within the scope of the appended claims and their equivalents.

What is claimed is:

1. A stereoscopic image display device, comprising:
a first substrate defining an active area and a non-active area surrounding the active area, the first substrate including:
a gate line formed at the active area and the non-active area,
a gate pad formed at the non-active area,
a dummy data line defining a dummy pixel by crossing the gate line, and
a light leakage blocking layer that is connected to the dummy data line and disposed to overlap the gate line and the gate pad;
a second substrate opposing the first substrate, the second substrate including:
a black stripe on an outer surface of the second substrate opposite from the first substrate along portions corresponding to edges of the active area, and
a patterned retardation film over the black stripe; and
a liquid crystal layer disposed between the first and second substrates.

2. The device according to claim 1, wherein the dummy data line is formed of the same material as the light leakage blocking layer.

3. The device according to claim 1, wherein the patterned retardation film has first and second retarders having different polarization state from each other.

4. The device according to claim 3, wherein the black stripe is formed on a boundary area of the first and second retarders.

5. The device according to claim 1, wherein the black stripe includes a non-transparent material.

6. The device according to claim 1, wherein the black stripe includes one of molybdenum-tungsten alloy (MoTi) and copper nitride ($CuN_x$).

7. The device according to claim 1, wherein the first substrate further includes a data line perpendicularly crossing the gate line to define a unit pixel, a thin film transistor connected to the gate and data lines, a color filter at the unit pixel, and a pixel electrode formed over the color filter and connected to the thin film transistor.

8. The device according to claim 1, wherein the second substrate further includes a polarizing plate between the black stripe and the patterned retardation film.

9. The device according to claim 1, wherein the dummy data line crosses the gate line substantially perpendicularly.

10. The device according to claim 1, wherein the second substrate further comprises an ITO layer disposed between the black stripe and the second substrate.

11. The device according to claim 1, wherein the black stripe extends into a portion corresponding to the non-active area.

12. The device according to claim 1, wherein the patterned retardation film includes a protection film and a patterned retarder.

13. A stereoscopic image display device, comprising:
a first substrate defining an active area having a plurality of unit pixels and a non-active area surrounding the active area, the first substrate including:
a plurality of dummy common lines and a gate pad at the non-active area,
a gate insulation layer formed on the dummy common lines and the gate pad,
a dummy data line on the gate insulation layer to correspond to the dummy common lines, and
a light leakage blocking layer that is connected to the dummy data line and disposed over one of the plurality of the dummy common lines and a portion of the gate pad;
a second substrate opposing the first substrate, the second substrate including:
a black stripe on an outer surface of the second substrate opposite from the first substrate at the non-active area along portions corresponding to edges of the active area, and
a patterned retardation film over the black stripe; and
a liquid crystal layer disposed between the first and second substrates.

14. The device according to claim 13, wherein the dummy data line is formed of the same material as the light leakage blocking layer.

15. The device according to claim 13, wherein the patterned retardation film has first and second retarders having different polarization state from each other.

16. The device according to claim 15, wherein the black stripe is formed on a boundary area of the first and second retarders.

17. The device according to claim 13, wherein the first substrate further includes a data line perpendicularly crossing the gate line to define a unit pixel, a thin film transistor connected to the gate and data lines, a color filter at the unit pixel, and a pixel electrode formed over the color filter and connected to the thin film transistor.

18. The device according to claim 13, wherein the second substrate further includes a polarizing plate between the black stripe and the patterned retardation film.

19. The device according to claim 13, wherein the black stripe extends into a portion corresponding to the non-active area.

20. The device according to claim 13, wherein the patterned retardation film includes a protection film and a patterned retarder.

21. The device according to claim 1, wherein the light leakage blocking layer extends from the dummy data line to partially overlap the gate pad.

22. The device according to claim 13, wherein the light leakage blocking layer extends from the dummy data line to partially overlap the gate pad.

23. The device according to claim 7, wherein the light leakage blocking layer is formed of the same layer and the same material as the data line and the dummy data line.

24. The device according to claim 17, wherein the light leakage blocking layer is formed of the same layer and the same material as the data line and the dummy data line.

* * * * *